United States Patent
Kummerer et al.

(10) Patent No.: US 9,046,274 B2
(45) Date of Patent: Jun. 2, 2015

(54) METHOD AND DEVICE FOR SETTING A TEMPERATURE CONTROL SYSTEM

(75) Inventors: Christoph Kummerer, Gauting (DE); Norbert Kummerer, Haimhausen (DE)

(73) Assignee: Thermozyklus GmbH & Co. KG (DE)

(*) Notice: Subject to any disclaimer, the term of this patent is extended or adjusted under 35 U.S.C. 154(b) by 1140 days.

(21) Appl. No.: 13/007,861

(22) Filed: Jan. 17, 2011

(65) Prior Publication Data
US 2011/0174476 A1    Jul. 21, 2011

(30) Foreign Application Priority Data
Jan. 21, 2010 (DE) .......................... 10 2010 005 275

(51) Int. Cl.
*F28F 27/02* (2006.01)
*F24D 19/10* (2006.01)
*G05D 7/06* (2006.01)

(52) U.S. Cl.
CPC ........ *F24D 19/1009* (2013.01); *F24D 19/1015* (2013.01); *G05D 7/06* (2013.01)

(58) Field of Classification Search
CPC ............ F24D 19/1009; F24D 19/1015; F24D 19/1018; F24D 19/1048
USPC ............................................. 236/24; 165/296
See application file for complete search history.

(56) References Cited

U.S. PATENT DOCUMENTS

| | | | | |
|---|---|---|---|---|
| 4,708,287 A * | 11/1987 | De Wit | ......................... | 237/8 R |
| 6,522,954 B1 * | 2/2003 | Kummerer et al. | ........... | 700/278 |
| 6,668,570 B2 * | 12/2003 | Wall et al. | ....................... | 62/223 |
| 2007/0000660 A1 | 1/2007 | Seerup et al. | | |

FOREIGN PATENT DOCUMENTS

DE    10312825    10/2004

OTHER PUBLICATIONS

"Tiator, Ingolf: Heizungsanlagen—Die neue Meisterprufung.3. Aufl. Vogel, 2006" pp. 233-236 and English language Abstract.

* cited by examiner

*Primary Examiner* — Jonathan Bradford
(74) *Attorney, Agent, or Firm* — The Webb Law Firm

(57) ABSTRACT

A method of setting a temperature control system, in particular a hot water heating system, having a plurality of heat transfer devices through which a heating or cooling agent flows, includes the following steps: establishing a heating or cooling agent volume flow value for each heat transfer device with the specification that each object to be temperature-controlled is to experience the same specific energy supply; and adjusting the volume flows to the established values. A device for carrying out this method is also included herein.

15 Claims, 1 Drawing Sheet

METHOD AND DEVICE FOR SETTING A TEMPERATURE CONTROL SYSTEM

TECHNICAL FIELD

The present invention relates to a method of setting a temperature control system, in particular a hot water heating system, including a plurality of heat transfer devices through which a heating or cooling agent flows. The present invention further relates to a device for carrying out this method.

BACKGROUND OF THE INVENTION

The term "temperature control system" in this connection is to be generally understood as a heating or cooling system. In the following, the conditions will be described primarily for a hot water heating system having a central circulating pump and a plurality of radiators (heating surfaces) serving as heat transfer devices. But the same considerations also apply to other systems with a flowing heating or cooling agent; any deviations relating to the technical implementation that are dependent on the type of system will be readily apparent to those of ordinary skill in the art.

In a hot water heating system, the heating water serving as the heating agent flows in accordance with the principle of least resistance. Without any special precautionary measures taken in the heating system, this path primarily leads through the radiators that are closest to the circulating pump; more remote radiators will not be sufficiently supplied. A widely used practice made use of as a remedy is to install a stronger pump and to increase the supply flow temperature. The consequences are a higher energy consumption, disturbing flow noises, sometimes overheated rooms, and a poor controllability of the system.

It is only by a hydraulic adjustment by means of which similar conditions are produced for all radiators that these problems can be solved with an optimum use of energy. The German Construction Contract Procedures (VOB) prescribe such a hydraulic balancing for every heating system (VOB/C DIN 18380). However, since the hydraulic balancing is difficult, it is, in practice, frequently carried out poorly or not at all. The design heating load, the system temperatures, the design of the heating surfaces, and the design volume flow for the radiators must be determined for each room. Then a pipe network calculation must be performed to establish the setting values of all control fittings. Finally, suitable fittings must be installed and appropriately set. An additional aggravating factor in old buildings is that the necessary data can often only be obtained by carrying out cost-intensive measurements on the existing heating system.

It is an object of the invention to make an improved setting of a temperature control system possible with justifiable expenditure.

BRIEF SUMMARY OF THE INVENTION

According to the invention, a method of setting a temperature control system, in particular a hot water heating system, having a plurality of heat transfer devices through which a heating or cooling agent flows (heat dissipation or heat absorption devices), includes the following steps:
 establishing a heating or cooling agent volume flow value for each heat transfer device with the specification that each object to be temperature-controlled is to experience the same specific energy supply; and
 adjusting the volume flows to the established values.

In the case of a hot water heating system, an "object to be temperature-controlled" typically is a room with at least one heat transfer device arranged therein in the form of a radiator. But an object may also be an article, a gas or a liquid that is temperature-controlled using one or more temperature control systems. In the case of a cooling system, the heat transfer device absorbs heat and the energy supply has a negative sign.

The invention is based on the finding that when using an automatically realizable hydraulic balancing including the above method features, the initially mentioned drawbacks can be avoided without any tedious establishments of data, calculations and settings being required therefor.

The invention further provides a device for carrying a method of setting a temperature control system. The device includes:
 a temperature control system having
  a source of heat or a heat sink, and
  a plurality of heat transfer devices through which a heating or cooling agent flows, a valve or a throttle device being provided for each heat transfer device for influencing the inflow of the heating or cooling agent; and
 a central evaluation/control unit with the aid of which the valves or throttle devices are adjusted to volume flow values of the heating or cooling agent. The volume flow values are established with the specification that each object to be temperature-controlled by the device is to experience the same specific energy supply.

BRIEF DESCRIPTION OF THE DRAWINGS

FIG. 1 shows a graph plotting the profile of the actual temperature over time with a thermocyclic control of a heating system, as well as the duration for which the heating system is switched ON;

DETAILED DESCRIPTION OF THE PREFERRED EMBODIMENT

Theoretically, a hydraulic balancing is attained when all parallel heat transfer devices (that is, all of the radiators in a heating circuit when a hot water heating system is involved) each have the same hydraulic resistance for the heating agent. Practically, however, this would only be possible when conditions remain constant; in particular, radiators would not be allowed to be shut off. For this reason, in practice, the hydraulic balancing is effected for the most critical state, i.e. at the maximum heating load when there is a flow through all of the radiators.

If all radiators are equal, then the hydraulic balancing ensures that each radiator of a heating circuit is supplied with the same amount of energy since the energy transported to the radiator is proportional to the temperature of the heating agent and to the volume flow.

Now, in practice, however, it is rarely the case that all radiators are equal because when selecting them, it is often required to take esthetic criteria and constructional circumstances into consideration. In addition, the type and/or the number of radiators has to be adjusted to the room to be heated and its location. A large room facing north will require a larger number of or larger radiators than a small room facing south. Only if the type and number of radiators have been selected to exactly match the heat demand of the room will the same thermal conditions develop in the room when the amount of energy supplied is the same since the dissipation to the room of the energy supplied and the room temperature that can thus be attained depend decisively on the local conditions in the room (thermal capacity, heat losses, heat gains). In order to reach the same room temperature, a well insulated room will require considerably less energy than a poorly insulated room.

These interrelations are taken into account to the greatest possible extent in the design of the radiators for a room. However, with radiators being industrially manufactured products, they can not be tailored to an individual room as exactly as desired, and identical thermal conditions will therefore develop in different rooms only in a rough approximation. For this reason, it is not optimal to balance all radiators to precisely the same volume flows.

A better procedure is to adjust the volume flows in accordance with the invention in such a way that each room is given precisely the amount of energy it needs in order to reach and maintain the same temperature as the other rooms (e.g., 20° C.). The energy supply should thus be made dependent on the heat demand of the room. It will be referred to as "specific energy supply" below. For an optimum hydraulic balance, the volume flows are therefore adjusted in such a way that the specific energy supply is as equal as possible for each room.

Figure 1:
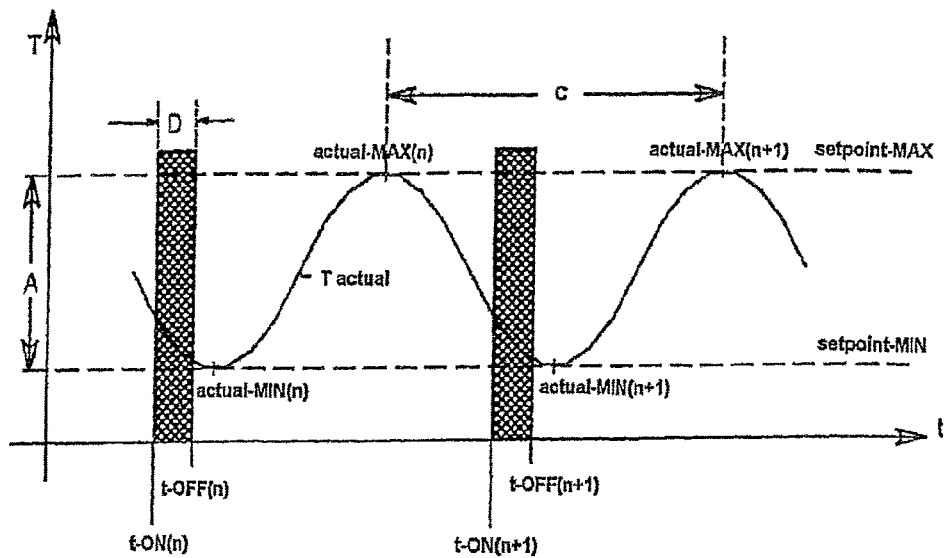

Such a hydraulic balancing can be carried out in practice very advantageously with the aid of information obtained in applying a special thermocyclic control method. A thermocyclic control method of this type is disclosed in EP 0 935 181 B1 and, for a better understanding of the present invention, which is based thereon, the essentials thereof will be discussed below with reference to FIG. 1.

The thermocyclic control method according to EP 0 935 181 B1 is based on the fundamental idea that the temperature of a room, object, gas or liquid to be heated or cooled will always perform oscillations about the actually desired setpoint value due to the inertia of the heating or cooling system and due to the ambient losses. While in the case of heating systems having simple thermostats, only one setpoint value is specified which, when exceeded, results in the heating being switched OFF and which, when no longer attained, results in the heating being switched ON, in the thermocyclic control method two setpoint values are specified which mark the maximum amplitude of the oscillations about the eventually desired temperature value, with the response of the room, object, gas or liquid to a heating or cooling process being automatically sensed and taken into account when the heating or cooling system is switched ON next time. The thermocyclic control method thus learns the parameters necessary for optimum regulation of the particular temperature control system by itself, without the user having to specify them in the process. When the thermocyclic control method detects, for example, that a radiator still gives off a relatively large amount of heat to the room to be heated after it has been switched OFF, resulting in the actual temperature exceeding the specified maximum setpoint temperature, then the radiator will be switched OFF correspondingly earlier in the next heating cycle.

The thermocyclic control method is thus based on the fundamental consideration that the heating and the room to be heated constitute a system that can be stimulated to perform temperature oscillations. From the type of stimulation and the temperature profile that develops in response to a particular stimulation, information can be continually obtained about the system and its current condition. This information is sufficient to generate controlled small amplitude temperature oscillations about a setpoint value (the desired temperature for the object) which approximate this setpoint value arbitrarily. For this purpose, the radiator is switched ON each time periodically and in-phase until such time as a temperature oscillation arises having defined minima and maxima. The minima and maxima here are located below and, respectively, above the setpoint value by very small amounts so that the setpoint value is approximated very precisely. Any deviations of the oscillations actually occurring from the anticipated oscillations are made use of by the self-learning control method to correct the stimulation, i.e. the ON switching point in time and the OFF switching point in time or the ON duration of the radiator. This means that the method continually tests the behavior of the system and determines from the response thereof the optimum ON and OFF switching points in time for the radiator.

If the temperature of the heating or cooling agent is adjustable, the thermocyclic control method can be carried out to advantage in such a manner that the required difference between the heating or cooling agent temperature and the actual temperature (referred to as supply flow temperature VT below) is established and set from the time interval as measured between the ON and OFF switching points in time of the temperature control system t-ON(n) and t-OFF(n) (referred to as ON duration D(n) below), as well as from the time interval as measured between the local temperature extreme values actual-MAX(n−1) and actual-MIN(n)—when the temperature control system is used for heating—or from the time interval as measured between the local temperature extreme values actual-MIN(n) and actual-MAX (n)—when the temperature control system is used for cooling (referred to as half cycle HC(n) below), including the following steps:

(a) lowering the supply flow temperature VT by a fraction B and modifying the heating or cooling agent temperature accordingly if the ON duration D(n) is smaller than the half cycle HC(n) multiplied by a factor F;

(b) elevating the supply flow temperature VT by a fraction B and modifying the heating or cooling agent temperature accordingly if the ON duration D(n) is greater than the half cycle HC(n) multiplied by a factor F;

(c) redefining the OFF switching point in time t-OFF(n+1) such that the ON duration D(n+1) in case (a) is lengthened by the fraction B and in case (b) is shortened by the fraction B.

This mode of carrying out the method permits a particularly energy-saving way of heating or cooling since the cooling agent does not need to be cooled unduly below the desired temperature or, respectively, the heating agent does not need to be heated unduly above the desired temperature, because the greater the difference between the cooling or heating agent temperature and the desired temperature, the more energy is unnecessarily consumed.

In an expedient alternative of the thermocyclic control method, instead of a half cycle HC(n) the time interval between the local maxima actual-MAX(n−1) and actual-MAX(n) is measured (referred to as full cycle FC(n) below), and this full cycle FC(n) is taken into account instead of the half cycle HC(n) in the method as described in the preceding paragraph.

A further expedient alternative resides in that the required difference between the heating or cooling agent temperature and the actual temperature (referred to as supply flow temperature VT below) is established and set from the continually established first derivation of the temperature profile as a function of time in the heated or cooled room, object, gas or liquid, including the following steps:

(a) forming the arithmetic mean from the amounts of the established first derivations of the temperature profile as a function of time in the time interval between the temperature extreme values actual-MAX(n−1) and actual-MIN(n) (referred to as mean(1) below) as well as in the time interval between the temperature extreme values actual-MIN(n) and actual-MAX(n) (referred to as mean(2) below);

(b) lowering the supply flow temperature VT by a fraction B and modifying the heating or cooling agent temperature accordingly if mean(1) is smaller than mean(2) multiplied by a factor F;

(c) elevating the supply flow temperature VT by a fraction B and modifying the heating or cooling agent temperature accordingly if mean(1) is greater than mean(2) multiplied by a factor F;

(d) redefining the OFF switching point in time t-OFF(n+1) such that the ON duration D(n+1) in case (b) is lengthened by the fraction B and in case (c) is shortened by the fraction B.

As an alternative to the above, it is also possible to specify a fixed value instead of the arithmetic mean from the first derivations of the temperature profile as a function of time mean(1).

Finally, the thermocyclic control method may also be applied to advantage when it is not the heating or cooling agent temperature but the heating or cooling power that can be controlled. This will be the case above all when the temperature control system is electrically powered. To this end, the thermocyclic control method as described is made use of with the modification that instead of the difference between the heating or cooling agent temperature and the actual temperature (i.e. the supply flow temperature VT), it is the heating power that is elevated or, respectively, lowered.

It is apparent from the above explanations that by means of the thermocyclic control method it can be determined for each room which difference is at least necessary between the desired temperature and the heating agent temperature in order to maintain the room at the desired temperature.

According to the thermocyclic control method described in EP 0 935 181 B1, this information is made use of to establish the minimum required supply flow temperature of the heating circuit to which the evaluated rooms are connected. But according to the invention, the information obtained is used for establishing the volume flow of the heating medium as required by each room in proportion to the other rooms for a specifically equal energy supply, as will be set forth in more detail below.

The thermocyclic control method described above provides for each room an identification number that is proportional to the energy supplied. This may be illustrated again by the following consideration: the thermocyclic control method switches the radiator of a room either fully ON or fully OFF, thus generating the desired micro-oscillations. For each room, specific pulse durations will arise in this way, in which the room is heated, and pause durations, in which the room is not heated. The ratio of pulse durations to pause durations here is a measure for the energy demand of the room.

From this the heating agent temperature can be calculated which is at least necessary to keep the room at the desired temperature. But it is also possible according to the invention to put all identification numbers of a heating circuit in relation to each other to determine which radiators are supplied with more or with less energy in comparison with the other radiators. Thus, a relative volume flow value related to a reference value is established for each object. Since the energy supply is not only proportional to the heating agent temperature, but also to the volume flow, it is also apparent from the identification numbers which radiators have larger or smaller volume flows in proportion to the other radiators, and to what extent. Now, for a hydraulic balancing, the radiator having the largest volume flow is not restricted, whereas the volume flow in all other radiators is throttled in accordance with their respective identification number.

This throttling can be realized in practice in particular in four ways as follows:

1. A central evaluation/control unit (microprocessor system) that applies the thermocyclic control is caused to output the corresponding identification numbers, and independent throttle devices are then appropriately set manually, or the identification numbers are input into an independent throttling system.

2. The central evaluation/control unit is caused to automatically set throttle devices that are independent of the radiator valves, provided that these throttle devices include appropriate independent actuators.

3. For the thermocyclic control, simple thermoelectric actuators on the radiator valves that have only two positions (open/close) are basically sufficient. When proportional actuators are used instead, the microprocessor system itself can use the identification numbers in connection with the thermocyclic control method for opening the actuators each time only so far as corresponds to the desired throttling. This means that in each room the actuator either "closes" or "opens to a throttled position". Any separate throttling valves may be dispensed with in this case.

4. Finally, the necessary throttling actions can also be attained by a pulse width modulation of the open state. For example, when it is intended to throttle the radiator by 70%, the valve will not be opened for the full time interval as calculated by the thermocyclic control method, but only for 70% thereof. The energy supply in this shortened period of time is the same as that during the full time interval with a 70% throttling of the volume flow. As a result, it is again possible to use the simple thermoelectric actuators mentioned above.

Figure 2:
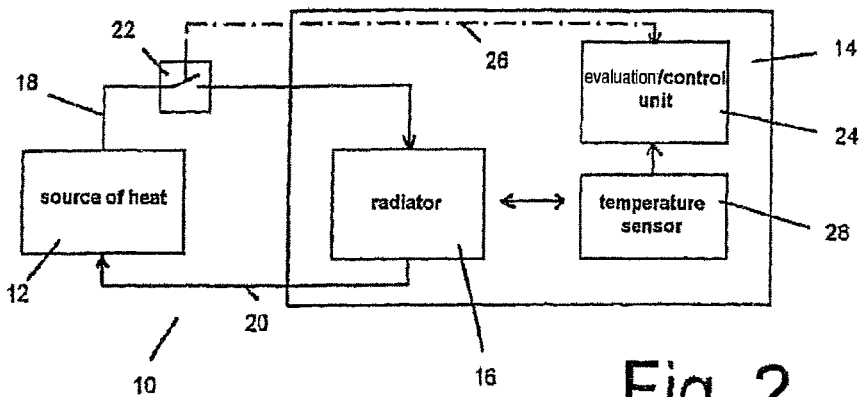
FIG. 2 shows the schematic arrangement of a room-heating temperature control system controlled by means of a thermocyclic control process.

FIG. 2 shows, schematically and by way of example, a device denoted by 10 in its entirety and having a temperature control system which is suitable both for carrying out the known thermocyclic control method and also for carrying out the method according to the invention of setting the temperature control system. The temperature control system essentially comprises a source of heat 12, e.g. an oil burner, and a plurality of heat transfer devices in the form of radiators 16 arranged in the rooms 14 to be heated (only one radiator is illustrated here for the sake of simplicity). The source of heat 12 and the radiator 16 are connected via pipes 18 and 20 for the heating agent, e.g. water, the heating agent being supplied via the pipe 18 (the so-called flow pipe) to the radiator 16, from which it flows out again via the so-called return 20 to reach the source of heat 12 for renewed heating. Arranged in the flow pipe 18 is a valve 22 which in the exemplary embodiment shown has two switching states only, namely either fully open or fully closed. The valve is controlled by means of a central evaluation/control unit 24 that generates appropriate control signals and transmits them to the valve 22 as indicated by the broken line 26. For detection of the actual temperature, a temperature sensor 28 is arranged in the room 14 and is coupled to the central evaluation/control unit 24 to which it continually transmits the temperature values as measured.

Figure 3:
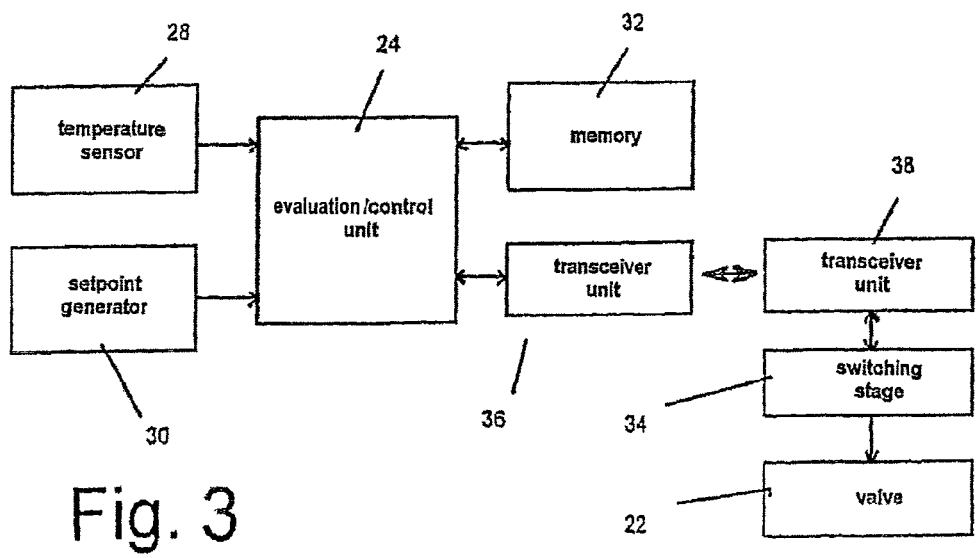
FIG. 3 shows the basic structure of a thermocyclic control device including a central evaluation/control unit.

In practice, the central evaluation/control unit 24 is coupled not only to a temperature sensor 28, but—as shown in FIG. 3—to an appropriate setpoint generator 30 as well, such as, e.g., a keypad or a rotary knob, by means of which the user of the method or the operator of the control device can set a temperature he/she desires. In addition, provision is expediently made for a memory 32 which the central evaluation/control unit 24 is able to access both for storing data and for retrieving data. For example, optimum ON and OFF switching points in time possible for various temperature setpoint values that are not currently set can be stored in such a memory. In practice, depending on the type and configuration of the valve 22, a switching stage 34 is further connected between the central evaluation/control unit 24 and the valve 22, the switching stage 34 converting the control signals generated by the central evaluation/control unit 24 into a mechanical movement of the valve 22. In this arrangement it is also possible—as shown in FIG. 3—to provide two transceiver units 36 and 38 between the switching stage 34 moving the valve and the central evaluation/control unit 24; by means of the transceiver units 36 and 38, the control signals generated by the central evaluation/control unit 24 and converted by the switching stage 34 are transmitted wireless or wired.

The invention claimed is:

1. A method of setting a temperature control system having a plurality of heat transfer devices through which a heating or cooling agent flows, the method comprising the following steps:
    after a heating cycle, initially establishing a heating or cooling agent volume flow value for each heat transfer device with the specification that each object to be temperature-controlled is to experience the same specific energy supply; and
    subsequently adjusting the volume flows to the established values,
    wherein the specific energy supply is determined by a ratio of pulse durations, in which the heating or cooling agent flows through the heat transfer device, to pause durations, in which no heating or cooling agent flows through the heat transfer device, and
    wherein the volume flow values are calculated from information based on a thermocyclic control process configured to control a desired temperature of each object based only on respective temperature data of each object.

2. The method according to claim 1, wherein, for each heat transfer device, a relative volume flow value relating to a reference value is established.

3. The method according to claim 1, wherein, for each object, a difference is determined between a desired temperature and a heating or cooling agent temperature which is at least necessary to keep the object at the desired temperature.

4. The method according to claim 1, wherein the thermocyclic control process provides for the heat transfer devices to be periodically switched ON and OFF to generate temperature oscillations about the desired temperature value.

5. The method according to claim 4, wherein for each object, the thermocyclic control process specifies two setpoint values which mark the maximum amplitude of the oscillations about the desired temperature value for the particular object.

6. The method according to claim 4, wherein the response of the objects to a heating or cooling is automatically detected and taken into account for subsequent operational activities of the heating or cooling system in order to establish optimum ON and OFF switching points in time for the heat transfer devices.

7. The method according to claim 3, wherein in establishing the heating or cooling agent volume flow value for each heat transfer device, the ratio of pulse durations, in which each object is temperature-controlled, to pause durations, in which the temperature is not controlled, is taken into account as a measure for the energy demand of the object.

8. The method according to claim 1, wherein for adjusting the volume flows to the established values, valves or throttle devices are used which are independent of the heat transfer devices and which are set manually or automatically with the aid of a central evaluation/control unit.

9. The method according to claim 1, wherein for adjusting the volume flows to the established values, proportional valves or throttle devices are used which are provided on the heat transfer devices and which are set automatically with the aid of a central evaluation/control unit.

10. The method according to claim 1, wherein for adjusting the volume flows to the established values, valves or throttle devices provided on the heat transfer devices are used, and that the calculation of time periods in which the valves or throttle devices are open and/or closed is based on a pulse width modulation.

11. A device for carrying out a method of setting a temperature control system, the device comprising:
    a temperature control system including
    a source of heat or a heat sink, and
    a plurality of heat transfer devices through which a heating or cooling agent flows, a valve or a throttle device being provided for each heat transfer device for influencing an inflow of the heating or cooling agent; and
    a central evaluation/control unit with the aid of which the valves or throttle devices are adjusted to reduce volume flow values of the heating or cooling agent, wherein the volume flow values are established with the specification that each object to be temperature-controlled by the device is to experience the same specific energy supply,
    wherein the specific energy supply is determined by a ratio of pulse durations, in which the valves or throttle devices are open, to pause durations, in which the valves or throttle devices are closed, and
    wherein the central evaluation/control unit is configured to control a desired temperature of each object based only on respective temperature data of each object.

12. The device according to claim 11, wherein the valves or throttle devices include actuators that are adapted to be driven by the central evaluation/control unit.

13. The device according to claim 11, wherein the valves or throttle devices only have two switching conditions, "open" and "close".

14. The device according to claim 11, wherein the central evaluation/control unit is designed to set the time periods in which the valves or throttle devices are open on the basis of a pulse width modulation.

15. The device according to claim 11, wherein the valves or throttle devices are proportionally adjustable valves or throttle devices attached to the heat transfer devices.

* * * * *